United States Patent
Lincoln et al.

(10) Patent No.: US 11,082,596 B2
(45) Date of Patent: Aug. 3, 2021

(54) ANAMORPHIC OPTICAL ASSEMBLY FOR MOBILE CAMERA-ENABLED DEVICE AND DEVICE CASE

(71) Applicant: Moment Inc, Seattle, WA (US)

(72) Inventors: Robert John Lincoln, Seattle, WA (US); Erik Hedberg, Sammamish, WA (US); Marc Barros, Seattle, WA (US); Audrey Louchart, Seattle, WA (US); Spencer Smith, Seattle, WA (US)

(73) Assignee: Moment Inc, Seattle, WA (US)

( * ) Notice: Subject to any disclaimer, the term of this patent is extended or adjusted under 35 U.S.C. 154(b) by 116 days.

(21) Appl. No.: 16/364,174

(22) Filed: Mar. 25, 2019

(65) Prior Publication Data

US 2019/0320101 A1    Oct. 17, 2019

Related U.S. Application Data (60) Provisional application No. 62/647,824, filed on Mar. 25, 2018.

(51) Int. Cl.
| | |
|---|---|
| *H04N 5/225* | (2006.01) |
| *G03B 17/12* | (2021.01) |
| *G03B 11/04* | (2021.01) |

(52) U.S. Cl.
CPC ......... *H04N 5/2257* (2013.01); *G03B 11/045* (2013.01); *G03B 17/12* (2013.01); *H04N 5/2253* (2013.01); *H04N 5/2254* (2013.01)

(58) Field of Classification Search
CPC .......................... G03B 17/565; G03B 17/566
See application file for complete search history.

(56) References Cited

U.S. PATENT DOCUMENTS

| | | | |
|---|---|---|---|
| 4,314,752 | A | 2/1982 | Ishizaba et al. |
| 7,612,997 | B1 | 11/2009 | Diebel et al. |
| 7,983,557 | B2 | 7/2011 | Misawa et al. |
| 8,244,299 | B1 | 8/2012 | Bishop |
| 8,593,745 | B2 | 11/2013 | O'Neill |
| 8,687,299 | B1 | 4/2014 | Sanford et al. |

(Continued)

FOREIGN PATENT DOCUMENTS

| | | |
|---|---|---|
| EP | 2613448 A1 | 7/2013 |
| WO | 2012/149206 A2 | 11/2012 |

(Continued)

OTHER PUBLICATIONS

PCT Notification of Transmittal of the International Search Report and the Written Opinion of the International Searching Authority, or the Declaration, for PCT Application No. PCT/US17/62650, report dated Feb. 5, 2018, 24 pages.

(Continued)

*Primary Examiner* — Twyler L Haskins
*Assistant Examiner* — Dwight Alex C Tejano
(74) *Attorney, Agent, or Firm* — SF Bay Area Patents, LLC; Andrew V. Smith (57) ABSTRACT

An anamorphic optical assembly includes a housing defining an anamorphic aperture, a hood, an optional sleeve, a bayonet coupling interface, and a catch mechanism. The bayonet coupling interface is configured for coupling the anamorphic optical assembly to a lens attachment interface that is coupled to or integral with the mobile electronic device or a protective case coupled thereto.

22 Claims, 6 Drawing Sheets

Anamorphic Rotating Design Concept
Purpose of design is to be able to rotate the Bayonet (pink) 90 degrees and lock it into 1 of 2 positions. This lens has to be oriented horizontally when shooting, so having the 2 different positions for one lens allows this lens to work on all of the devices that we support

(56) References Cited

U.S. PATENT DOCUMENTS

| | | |
|---|---|---|
| 8,843,177 B2 | 9/2014 | Mori et al. |
| 9,071,671 B2 | 6/2015 | Guzman |
| 9,197,726 B2 | 11/2015 | Stanimirovic et al. |
| 9,467,608 B2 | 10/2016 | Barros et al. |
| 9,596,393 B2 | 3/2017 | Barros et al. |
| 9,624,958 B2 | 4/2017 | Hyers |
| 9,729,770 B2 | 8/2017 | Barros et al. |
| 9,781,319 B2 | 10/2017 | Barros et al. |
| 9,838,581 B2 | 12/2017 | Barros et al. |
| 10,003,724 B2 | 6/2018 | Barros et al. |
| 10,038,830 B2 | 7/2018 | Barros et al. |
| 10,139,819 B2 | 11/2018 | Hollida et al. |
| 10,313,568 B2 | 6/2019 | Barros et al. |
| 10,334,158 B2 | 6/2019 | Gove |
| 10,348,946 B2 | 7/2019 | Barros et al. |
| 10,375,284 B2 | 8/2019 | Barros et al. |
| 10,416,535 B2 | 9/2019 | Mallette |
| 10,527,227 B1 | 1/2020 | Miller |
| 10,582,093 B2 | 3/2020 | Crone |
| 10,588,008 B2 | 3/2020 | Sato et al. |
| 10,574,995 B2 | 5/2020 | Mohammed et al. |
| 10,642,271 B1 | 5/2020 | Graber et al. |
| 10,661,898 B2 | 5/2020 | White, III et al. |
| 10,795,240 B2 | 10/2020 | Barros et al. |
| 10,798,279 B2 | 10/2020 | Barros et al. |
| 2002/0000689 A1 | 1/2002 | Isogal et al. |
| 2006/0124676 A1 | 6/2006 | Mastrosimone |
| 2006/0233545 A1 | 10/2006 | Semba et al. |
| 2007/0048470 A1 | 3/2007 | Zadesky et al. |
| 2007/0049340 A1* | 3/2007 | Wang ............... H04M 1/0264 455/557 |
| 2007/0280677 A1* | 12/2007 | Drake ............... G03B 29/00 396/429 |
| 2008/0002968 A1 | 1/2008 | Arai |
| 2008/0172708 A1 | 7/2008 | Perry et al. |
| 2008/0271104 A1 | 10/2008 | Perry et al. |
| 2008/0271105 A1 | 10/2008 | Perry et al. |
| 2008/0276293 A1 | 11/2008 | Perry et al. |
| 2009/0089842 A1 | 4/2009 | Perry et al. |
| 2009/0109558 A1* | 4/2009 | Schaefer ............... G02B 7/02 359/827 |
| 2009/0169198 A1* | 7/2009 | Chang ............... G02B 7/02 396/529 |
| 2009/0181729 A1 | 7/2009 | Griffin, Jr. et al. |
| 2009/0299813 A1 | 12/2009 | Cody et al. |
| 2010/0253826 A1 | 10/2010 | Green et al. |
| 2012/0236425 A1* | 9/2012 | O'Neill ............... H04N 5/2254 359/827 |
| 2012/0275025 A1 | 11/2012 | Parril |
| 2012/0282977 A1 | 11/2012 | Haleluk |
| 2013/0063554 A1 | 3/2013 | Green et al. |
| 2013/0100336 A1 | 4/2013 | Shintani |
| 2013/0107109 A1* | 5/2013 | Yang ............... G02B 7/02 348/373 |
| 2013/0177304 A1 | 7/2013 | Chapman et al. |
| 2013/0206614 A1 | 8/2013 | O'Neill et al. |
| 2014/0022434 A1 | 1/2014 | Morita |
| 2014/0065948 A1 | 3/2014 | Huang et al. |
| 2014/0071547 A1* | 3/2014 | O'Neill ............... G03B 17/565 359/827 |
| 2014/0071548 A1* | 3/2014 | Sanford ............... G02B 15/10 359/828 |
| 2014/0072362 A1 | 3/2014 | Hyers |
| 2014/0078594 A1* | 3/2014 | Springer ............... G02B 7/16 359/672 |
| 2014/0128132 A1 | 5/2014 | Cox, III |
| 2014/0132832 A1 | 5/2014 | Adams |
| 2014/0171150 A1 | 6/2014 | Hurst et al. |
| 2014/0267882 A1 | 9/2014 | O'Neill |
| 2014/0267891 A1 | 9/2014 | Adams |
| 2015/0002950 A1* | 1/2015 | O'Neill ............... G03B 17/566 359/827 |
| 2015/0042877 A1* | 2/2015 | O'Neill ............... G03B 17/566 348/376 |
| 2015/0049244 A1 | 2/2015 | Tokunaga |
| 2015/0194833 A1 | 7/2015 | Fathollahi et al. |
| 2016/0014318 A1 | 1/2016 | Okabe |
| 2016/0124290 A1 | 5/2016 | Bergreen et al. |
| 2016/0181580 A1 | 6/2016 | To et al. |
| 2016/0216477 A1 | 7/2016 | Barros et al. |
| 2017/0261182 A1* | 9/2017 | Wang ............... G02B 19/0047 |
| 2019/0141221 A1 | 5/2019 | Barros et al. |
| 2019/0158642 A1 | 5/2019 | Barros et al. |
| 2019/0250415 A1* | 8/2019 | Sasaki ............... G02B 13/08 |
| 2019/0250487 A1 | 8/2019 | Barros et al. |
| 2019/0320101 A1 | 10/2019 | Barros et al. |
| 2020/0029000 A1 | 1/2020 | Barros et al. |
| 2020/0036874 A1 | 1/2020 | Barros et al. |
| 2020/0036875 A1 | 1/2020 | Barros et al. |

FOREIGN PATENT DOCUMENTS

| | | |
|---|---|---|
| WO | 2014/040005 A1 | 3/2014 |
| WO | 2016/122990 A2 | 8/2016 |
| WO | 2016/122990 A3 | 10/2016 |
| WO | 2018/094367 A2 | 5/2018 |
| WO | 2018/094369 A1 | 5/2018 |
| WO | 2018/094367 A3 | 3/2020 |

OTHER PUBLICATIONS

PCT Notification of Transmittal of International Preliminary Report on Patentability Chapter I, and International Preliminary Report on Patentability Chapter I, for PCT Application No. PCT/US17/62650, report dated Mar. 5, 2020, 11 pages.

Non-Final Rejection, dated Dec. 30, 2019, for U.S. Appl. No. 16/314,622, filed Dec. 31, 2018.

PCT Notification of Transmittal of the International Search Report and the Written Opinion of the International Searching Authority, or the Declaration, for PCT Application No. PCT/US17/62653, report dated Jan. 25, 2018, 16 pages.

PCT Notification Concerning Transmittal of International Preliminary Report on Patentability (Chapter I of the Patent Cooperation Treaty) (PCT Rule 44bis.l(c)), for PCT Application No. PCT/US17/62653, report dated May 31, 2019, 13 pages.

Non-Final Rejection, dated May 4, 2020, for U.S. Appl. No. 16/237,461, filed Dec. 31, 2018.

Notice of Allowance, dated Oct. 26, 2020, for U.S. Appl. No. 16/237,461, filed Dec. 31, 2018.

Non-Final Rejection, dated May 18, 2020, for U.S. Appl. No. 16/237,498, filed Dec. 31, 2018.

Non-Final Rejection, dated Apr. 1, 2020, for U.S. Appl. No. 16/430,417, filed Jun. 3, 2019.

Notice of Allowance, dated Jun. 2, 2020, for U.S. Appl. No. 16/430,417, filed Jun. 3, 2019.

Notice of Allowance, dated Jul. 14, 2020, for U.S. Appl. No. 16/314,622, filed Dec. 31, 2018.

\* cited by examiner

Anamorphic Rotating Design Concept
Purpose of design is to be able to rotate the Bayonet (pink) 90 degrees and lock it into 1 of 2 positions. This lens has to be oriented horizontally when shooting, so having the 2 different positions for one lens allows this lens to work on all of the devices that we support

Figure 1

Anamorphic Rotating Design Concept

1. Take the bayonet and put the hood on top of it
2. Press fit the sleeve to bayonet through the the hood, using adhesive to bond the the sleeve to the bayonet, capturing the hood in place and allowing the bayonet to rotate 90 around the lip of the hood
3. Be sure to align slot in sleeve, with threaded hole of bayonet Figure 2A                        Figure 2B

Anamorphic Rotating Design Concept

1. Take housing and align the indents like below image
2. Use the threaded hole in the bayonet as a reference
3. Adhere the housing to the bayonet with permanent Loctite adhesive

Figure 3A  Figure 3B

Anamorphic Rotating Design Concept

1. Thread in the M2x2.5mm set screw into side of bayonet
2. Tighten until it makes contact, locking the bayonet so it cannot rotate There are 2 pockets in the housing. This allows the bayonet to rotate 90 degrees, giving it 2 different positions.

ANAMORPHIC OPTICAL ASSEMBLY FOR MOBILE CAMERA-ENABLED DEVICE AND DEVICE CASE

PRIORITY AND RELATED APPLICATIONS

This application claims the benefit of priority to U.S. provisional patent application Ser. No. 62/647,824, filed Mar. 25, 2018, which is hereby incorporated by reference.

This application is a continuation of PCT/US17/62653, filed Nov. 20, 2017, which claims the benefit of priority to U.S. provisional patent application Ser. No. 62/424,318, filed Nov. 18, 2016, and Ser. No. 62/452,951, filed Jan. 31, 2017.

This application is a continuation of PCT/US17/62650, filed Nov. 20, 2017, which claims the benefit of priority to U.S. provisional patent application Ser. No. 62/424,387, filed Nov. 18, 2016 and Ser. No. 62/452,943, filed Jan. 31, 2017.

This application is related to U.S. provisional patent applications Ser. No. 62/452,951, filed Jan. 31, 2017; Ser. No. 62/452,943, filed Jan. 31, 2017; Ser. No. 62/424,387, filed Nov. 18, 2016; Ser. No. 62/424,318, filed Nov. 18, 2016; Ser. No. 62/108,506, filed Jan. 27, 2015; Ser. No. 29/593,579, filed Feb. 9, 2017; Ser. No. 29/593,576, filed Feb. 9, 2017; Ser. No. 29/592,638, filed Jan. 31, 2017; and U.S. patent application Ser. No. 15/715,189, filed Sep. 26, 2017; Ser. No. 15/671,076, filed Aug. 7, 2017; Ser. No. 15/437,439, filed Feb. 20, 2017; Ser. No. 15/289,094, filed Oct. 7, 2016; Ser. No. 14/624,577, filed Feb. 17, 2015; Ser. No. 14/624,573, filed Feb. 17, 2015; Ser. No. 14/624,571, filed Feb. 17, 2015; Ser. No. 14/624,568, filed Feb. 17, 2015; and U.S. Pat. Nos. 9,838,581; 9,729,770; 9,467,608; 9,781,319; 9,596,393; and U.S. published patent applications nos. US 2018-0027156 A1; US 2017-0223242 A1; US 2017-0099419 A1; US 2016-0216477 A1; US 2016-0219197 A1; US 2016-0219202 A1; US 2016-0219194 A1; and PCT published application no. WO2016/122990 and PCT application serial nos. PCT/US17/62653, filed Nov. 20, 2017; PCT/US17/62650, filed Nov. 20, 2017; PCT/US16/14652, filed Jan. 25, 2016; European patent application no. 16743894.4 (EP3251219); Taiwanese patent application no. 105102568 (TW201640880A).

Each of these patents and patent applications is incorporated by reference.

BACKGROUND

Embedded devices such as mobile phones, including Android, Apple and Samsung phones, are often equipped with miniature camera modules. These miniature camera modules typically include only a single fixed-focus lens and an image sensor. Some of these devices have software applications downloaded or otherwise stored on them that permit limited choices in precapture camera settings, such as exposure duration and flash setting, and some provide limited post-capture image editing capabilities designed to compensate for the inadequacy of the built-in optics. Image processing software is however incapable of providing real images of objects that are too close or too far from the device, or of scenes including multiple objects that require greater depths of field in order to capture them without intolerable amounts of defocus blur or of scenes with moving objects without excessive motion-related blur, among other imaging issues. It is therefore desired to be able to supplement the built-in optics of a miniature camera-enabled embedded device with one or more additional lenses or other optics.

Auxiliary lenses for mobile smartphones with camera modules are typically clipped onto the smartphone. These clip-on lenses put mechanical stresses on the smartphone directly along the optical path of the camera modules that can result in distortional stresses that can mechanically weaken the device and can distort the optical quality of captured images. Clip-on lenses are also unstable and often move laterally when smartphone precapture settings are being adjusted, during image capture and when the smartphone is being temporarily stored in a bag or pocket or on a table top. It is desired to have a way to attach an auxiliary lens to a mobile device in stable alignment with the optics of the built-in camera module.

Smartphones are used for capturing digital images in a variety of situations. In the past, a person operating a camera could not be in the picture because of the unwieldy nature of the camera and the camera-object distances typically involved in capturing an entire scene that may include multiple persons and perhaps background buildings or other objects. Some conventional cameras include a built-in delay to allow the camera operator to quickly duck into the scene that is based on a predetermined time duration or that uses face recognition techniques wherein image capture awaits a smiling camera operator to enter the scene. Either way, it is difficult to spontaneously, stably and accurately position and direct a camera to capture a picture without being held by a human operator. Today, "selfies" are more commonly made possible because smartphones and other mobile devices with built-in miniature camera modules are permit front-side display of the precapture image and these mobile devices are typically lightweight enough to hold in one hand while an image is captured. Nonetheless, it is desired to be able to more easily handle a mobile device during a one-handed image capture.

Today there are several competitive mobile device brands. With the rollouts of each updated version of each of these brand product lines, there are often developments in the miniature camera modules that are included components of the mobile devices. Such mobile devices may be identified as camera-enabled mobile devices, wherein ipods are an example of a camera-enabled mobile device that does not include a cellular phone capability, while iphones are example of camera-enabled mobile phone devices from Apple. There are likewise Samsung brand mobile devices and Android-based devices known by several additional brand names. Sometimes the orientation of the camera module relative to the orientation of the housing of the mobile device. For example, the camera module of the iphone 8 is rotated ninety degrees relative to the device housing compared to the orientation of the camera module of the iphone X. It is desired to have an auxiliary lens assembly for coupling to a mobile device via a lens attachment interface such as a mobile phone case or other interface attachment that may be conveniently adjusted to accommodate the camera modules that are disposed in either of these orientations or that are arbitrarily relatively orientationally disposed relative to the camera housing.

DETAILED DESCRIPTIONS OF THE EMBODIMENTS

An anamorphic optical assembly is provided that is configured for coupling within an optical path of a miniature camera module of a mobile electronic device to change an aspect ratio of an image captured by the device. The anamorphic optical assembly includes a housing defining an anamorphic aperture, a hood, an optional sleeve, a bayonet coupling interface, and a catch mechanism. The bayonet coupling interface is configured for coupling the anamorphic lens assembly to a lens attachment interface that is coupled to or integral with the mobile electronic device or a protective case coupled thereto. The hood is disposed between an object facing surface of the bayonet coupling interface and an object end of the optical path of the miniature camera module of the mobile electronic device. The housing defining the anamorphic aperture is disposed adjacent to the bayonet coupling interface within a hollow interior volume of the hood. The optional sleeve is coupled concentrically between the bayonet coupling interface and the housing that defines the anamorphic aperture. The sleeve is configured to facilitate smooth rotation of the bayonet coupling interface relative to the anamorphic aperture defined within the housing. The catch serves to couple the housing defining the anamorphic aperture in fixed orientation within the open interior hood volume relative to one or more bayonet tabs of the bayonet coupling interface that are rotatable relative to the orientation of the anamorphic aperture when the catch is unlatched from the bayonet coupling interface. The one or more bayonet tabs are relatively rotatable between at least two positions about the optical axis of the anamorphic lens assembly or a second axis parallel to the optical axis.

The catch may include a screw, pin, rod or other latching mechanism configured in certain embodiments for penetrating both a cavity defined in an outer surface of the bayonet coupling interface and a slot defined in an outer surface of the sleeve, and to couple with a receiving cavity defined in the housing. In certain example embodiments, the receiving cavity in the housing is threaded and the catch includes a screw that couples and uncouples by turning the screw. In other embodiments, the catch may be spring loaded and releasable from the receiving cavity by lever action.

The lens attachment interface to which the bayonet coupling interface is configured to couple may include a protective mobile device case that partially or fully encloses the mobile electronic device with one or more layers of protective materials. The protective material of the case may even define a lens attachment aperture therein.

The anamorphic aperture defined within the housing of the anamorphic optical assembly in accordance with certain embodiments may have an oblong shape which facilitates a change in aspect ratio. The oblong shape may include an approximately rectangular shape or alternatively an elliptical shape, a snowman shape, a heart shape, a trapezoidal shape, a rhombus shape or a squashed parallepiped shape or a double image shape including side by side images having a same symmetrical or asymmetrical shape or another desired shape of a captured digital image.

The oblong optical shape of the anamorphic aperture may be fixed orientationally to the sleeve or to the hood such that one or more bayonet tabs are rotatable relative to an orientation of the oblong anamorphic aperture. The anamorphic aperture may be rotatable between horizontal and vertical orientations having an angular spacing of ninety degrees.

A miniature camera module is also provided that is configured for capturing images using a mobile electronic device. The miniature camera module may include a focusing lens, an image sensor disposed at a focal plane of the focusing lens, and the anamorphic lens assembly as described in any of the several example embodiments described herein.

A method is provided for changing an aspect ratio of an image captured by a miniature camera module installed on a mobile device. The method may include coupling an anamorphic optical assembly within an optical path of a miniature camera module of a mobile electronic device, including coupling a bayonet coupling interface of the anamorphic optical assembly to a lens attachment interface that is coupled to or integral with the mobile device or a mobile device case. A sleeve may be disposed concentrically between the bayonet coupling interface and a housing component that has an anamorphic aperture defined therein to change an aspect ratio of an image captured by a miniature camera module on a mobile device. The sleeve may be configured to facilitate smooth rotation of one or more bayonet tabs of the bayonet coupling interface relative to the sleeve. The housing component may be latched in fixed orientation relative to the sleeve such that the one or more bayonet tabs of the bayonet coupling interface are rotatable relative to the orientation of the anamorphic aperture between at least two positions about the optical axis of the anamorphic lens assembly or a second axis parallel to the optical axis. The bayonet coupling interface may be latched together with the housing when adjusting the orientation of the anamorphic aperture relative to the one or more bayonet tabs of the optical assembly is not desired.

The method may include latching the bayonet coupling interface through the sleeve to the housing to fix the orientation of the anamorphic aperture at a selected orientation and unlatching the bayonet coupling interface from the housing through the sleeve to change the orientation of the anamorphic aperture to a different orientation relative to the one or more tabs of the bayonet coupling interface, and therefore changing the orientation relative to the mobile device orientation or an orientation of a miniature camera module installed on the device. The different orientations may include horizontal and vertical orientations having angular spacing of approximately ninety degrees.

One or more non-transitory digital storage devices may also be provided that have code embedded therein for programming a processor to perform a method of changing an aspect ratio of an image captured by a miniature camera module installed on a mobile electronic device in accordance with any of the methods described herein above or below herein.

Another auxiliary anamorphic optical assembly for a mobile device that includes a miniature camera module. An auxiliary anamorphic optical assembly in this example includes a lens holder, an auxiliary anamorphic lens coupled to the lens holder, and a micro-bayonet coupling interface. The auxiliary lens attachment interface may be configured in accordance with the miniature camera module of the mobile device, and may be configured to stably couple to the mobile device, and may be configured in accordance with the micro-bayonet coupling interface of the auxiliary lens assembly to stably couple and align the auxiliary lens along an optical path of the miniature camera module of the mobile device. A flash aperture may be defined in the lens attachment interface shaped to permit a light source of the miniature camera module of the mobile device to illuminate an object to be captured. A camera aperture may be defined in the lens attachment interface that is configured to receive light reflected from the object as a digital image to travel along the optical path to a built-in image sensor of the miniature camera module of the mobile device.

The camera aperture may include an oblong region that is configured in size and shape to receive a micro-bayonet coupling interface of the auxiliary anamorphic optical assembly in a first orientation when a long dimension of the micro-bayonet coupling interface is approximately in parallel with a long dimension of the oblong region of the camera aperture, and to rotatably couple the auxiliary lens assembly in stable alignment along the optical path of the miniature camera module when the long dimension of the micro-bayonet coupling interface is relatively rotated out of parallel with the long dimension of the oblong region and thereby caught on an image side of the auxiliary lens attachment interface with the auxiliary lens stably disposed on an object side of the auxiliary lens attachment interface in alignment with the miniature camera module of the mobile device.

The auxiliary anamorphic optical assembly may include a flash aperture and a camera aperture that form a single camera flash aperture. The flash aperture and the camera aperture may be separated by an area of the lens attachment interface that partially defines segments of both of the separated flash and camera apertures.

The auxiliary anamorphic optical assembly may include an auxiliary lens attachment interface that is configured to define therein the auxiliary lens attachment aperture shaped both to permit a light source of the miniature camera module of the mobile device to illuminate an object to be captured and to receive light reflected from the object as a digital image to travel along the optical path of the miniature camera module to a built-in image sensor of the miniature camera module of the mobile device.

A protective case for a camera-enabled mobile device may be configured for coupling with an auxiliary anamorphic optical assembly. An auxiliary anamorphic attachment may define an auxiliary lens recess configured for facilitating rotatably coupling thereto the micro-bayonet coupling interface of the auxiliary lens assembly for stably coupling of the auxiliary lens in optical alignment with the miniature camera module of the mobile device.

An auxiliary lens attachment interface may be configured for adhesive coupling to the mobile device. An auxiliary lens attachment interface may be sized and shaped in accordance with a size and shape of the mobile device.

The camera aperture may be coaxially configured in accordance with an optical path of a miniature camera module of a mobile device. The micro-bayonet coupling interface of the auxiliary lens assembly may include a bayonet tab. The auxiliary lens attachment interface may include a detent portion that at least partially defines a lens attachment aperture that is shaped in accordance with the bayonet tab of the auxiliary lens assembly to stably couple and align the auxiliary lens along the optical path of the miniature camera module of the mobile device.

The auxiliary anamorphic optical assembly may include a bayonet tab that includes an oblong shape. The lens attachment interface may include a detent that defines an oblong shape having a short dimension that is smaller than the long dimension of the bayonet tab such that the oblong shape of the lens attachment aperture is penetrable by the bayonet tab at a first relative orientation while the bayonet tab stably couples within the oblong lens attachment aperture in a second relative orientation upon rotation thereof. Once the bayonet coupling interface is stably coupled to the lens attachment interface of the mobile device or mobile device case or stand-alone interface, the bayonet coupling interface can be rotated ninety more degrees while the housing of the anamorphic optical assembly is statically disposed in a fixed orientation relative to the bayonet coupling interface thereby changing an angle at which an image is modified by the anamorphic aperture defined in the housing or hood.

An auxiliary optical assembly may be configured such that a camera aperture is disposed in a first plane while a detent overlaps a rounded cavity in a second plane that is spaced-apart from a first plane along the optical path of a miniature camera module. An oblong auxiliary lens attachment region and a flash portion adjacent to the lens attachment region may be defined, respectively, to allow the miniature camera module to capture digital images on a built-in image sensor and to permit light from a mobile device flash to illuminate an object to be imaged.

The lens attachment region of the camera aperture may be defined in a first plane in certain embodiments that is spaced further from an image sensor of the miniature camera module than a second plane within which the flash portion may be defined. The lens attachment region may define a circular cavity in a first plane while the detent may overlap the circular cavity in a second plane that is spaced-apart from the first plane along the optical path.

An auxiliary anamorphic optical assembly may include an auxiliary lens holder that defines a cavity around the optical path of the miniature camera module to permit light from an object being imaged to reach an image sensor of the miniature camera module. The micro-bayonet coupling interface may also define a cavity around the optical path of the miniature camera module to permit light from an object being imaged to reach an image sensor of the miniature camera module. Cavities defined in the micro-bayonet coupling interface and auxiliary anamorphic optical element holder may be configured to be approximately coaxial with the optical paths of the miniature camera module and auxiliary anamorphic optical element.

A camera aperture of an auxiliary lens attachment interface is configured to be coaxial with a miniature camera module, when the auxiliary lens attachment interface is coupled to a mobile device, to permit light from an object to be captured as a digital image to travel along the optical path of the miniature camera module to the built-in image sensor of the mobile device. The auxiliary anamorphic optical attachment interface and camera aperture may be shaped for stably coupling with a micro-bayonet coupling interface of an auxiliary anamorphic optical assembly.

An auxiliary anamorphic optical assembly may be configured to couple with a camera-enabled mobile device by coupling with an auxiliary anamorphic optical attachment interface that includes an interface detail co-molded into the material of the case, which may be formed from stamped metal and/or may include a mount plate that is configured to be adhesively or magnetically coupled to the back or inside of a mobile device housing.

An auxiliary anamorphic lens attachment interface in accordance with another example embodiment may be configured for stably coupling an auxiliary anamorphic optical assembly, including an auxiliary anamorphic lens, aperture or other optic, a lens holder and a micro-bayonet coupling interface, along an optical path of a miniature camera module of a mobile device to modify one or more imaging parameters, including an aspect ratio of captured images, of the miniature camera module.

A protective mobile device case configured for coupling around a mobile electronic device that includes a miniature camera module may include a case housing configured to securely couple around at least a portion of the periphery of the camera-enabled mobile device, and an auxiliary anamorphic lens, aperture or other anamorphic optical attachment interface that is integral with or embedded within a case housing.

A mobile camera system may include a camera-enabled, mobile device, including a miniature camera module embedded within the mobile device that includes a built-in lens and an image sensor for capturing digital images. A mobile device processor is configured for processing the digital images. A mobile device display is configured for viewing the digital images. A case housing may be configured to securely couple around at least a portion of the periphery of the camera-enabled mobile device. A display aperture may be defined in the case that is shaped to permit touch access to the mobile device display. A case camera flash aperture may be defined in the case and anamorphically-filtered to permit a light source of the miniature camera module of the mobile device to illuminate an object to be captured and to receive light reflected from the object to be captured as a cinematically-enhanced digital image Referring to FIG. 1, an anamorphic optical assembly in accordance with certain embodiments is schematically illustrated in an exploded view. The optical assembly of FIG. 1 includes a housing, a sleeve, a hood, a bayonet coupling interface and a set screw or other latching rod, pin or spring-loaded catch. When the set screw is in a position wherein cavities in both the housing and the bayonet interface are penetrated, then the bayonet interface and the housing are not relatively rotatable, such as when an image is being captured. In certain embodiments, wherein the set screw is in a position wherein the cavity in the housing is not penetrated, but a slot in the sleeve is penetrated, then, the bayonet interface and sleeve are rotatable relative to the housing whereby such rotation changes an orientation of an anamorphic aperture defined in the housing relative to a camera or miniature camera module orientation. When the set screw is not inserted or is only penetrating a cavity defined in the bayonet interface, then the bayonet may be rotated relative to the housing, sleeve and hood such as when it is desired to adjust an orientation of an aspect ratio change in captured images that is facilitated by using an anamorphic lens, aperture or other optic. In certain embodiments, the sleeve may not be rotatable relative to the housing and in other embodiments the sleeve may not be rotatable relative to the bayonet interface and in other embodiments, the sleeve may be rotatable relative to either the housing or the bayonet interface.

Figure 1:
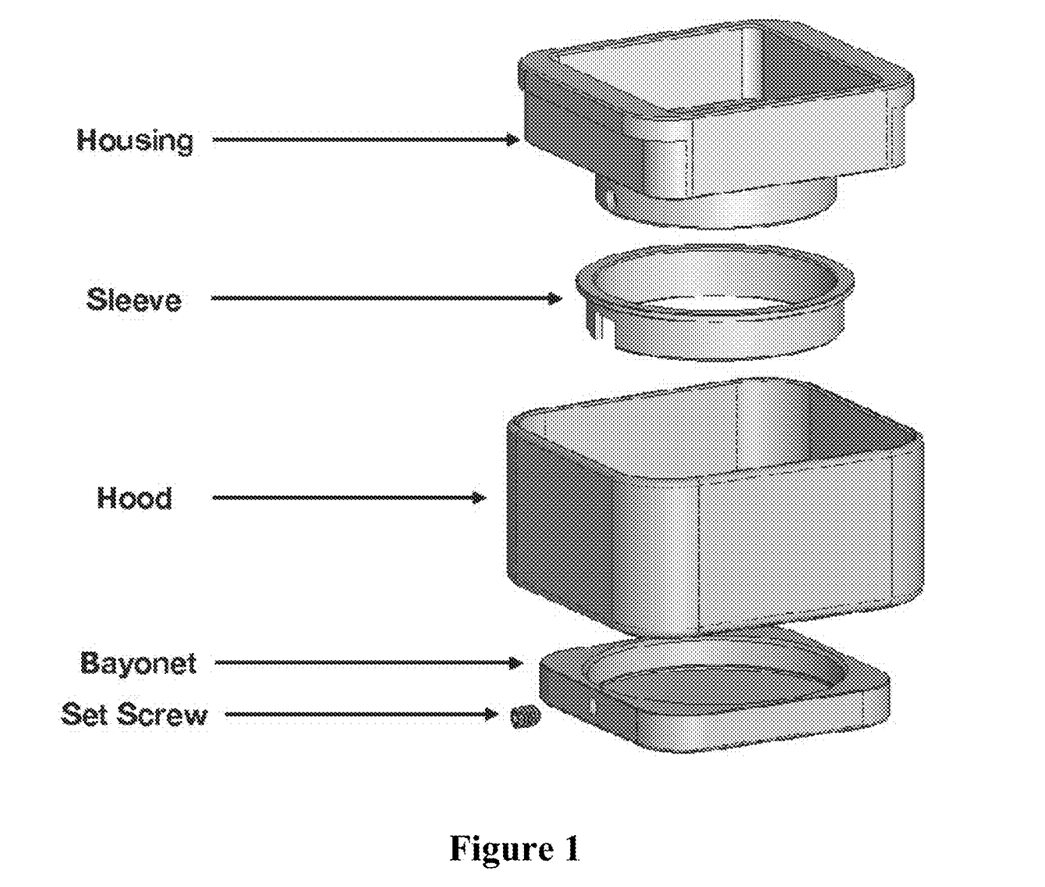
FIG. 1 schematically illustrates an exploded view of an anamorphic optical assembly in accordance with certain embodiments.

In other embodiments, the sleeve is not provided in concentric disposition between the bayonet interface and the housing defining an anamorphic aperture, an anamorphic lens or an anamorphic image adjustment processor. In these embodiments, the housing and bayonet interface are relatively rotatable except when the catch is in latched position affixing the housing and bayonet interface in static rotational disposition. In other embodiments, a single housing component is shaped to serve as both a hood and as an anamorphic optical element that is rotatable relative to the bayonet coupling interface to accommodate differently oriented mobile devices and on-board camera modules.

The example embodiment of FIG. 1 illustrates an anamorphic rotating design concept. This design enables rotation of the bayonet interface by 90 degrees and is lockable and unlockable into one of two positions that are 90 degrees orientationally spaced apart. This lens may be oriented horizontally when shooting for capturing images with a cinematic aspect ratio and feel, so having the two different positions for one anamorphic lens allows this same lens to work on devices that are oriented in either of two perpendicular positions.

Figure 2A:
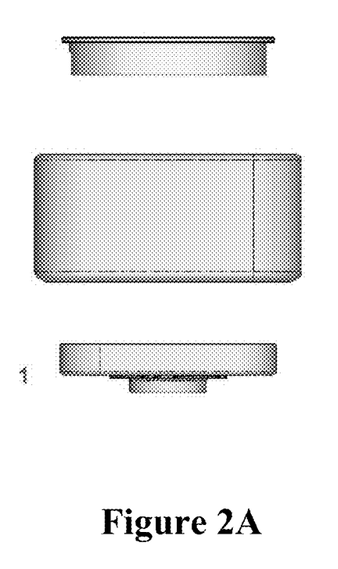
FIGS. 2A-2B schematically illustrate a method of assembling a hood, a housing defining an anamorphic aperture, a sleeve and a bayonet coupling interface to form an anamorphic optical assembly in accordance with certain embodiments.
Figure 2B:
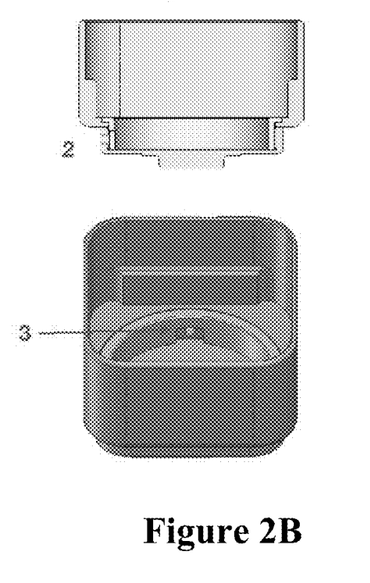

FIGS. 2A-2B schematically illustrate a method of assembling a housing defining an anamorphic aperture, a sleeve and a bayonet coupling interface to form an anamorphic optical assembly with adjustable orientation of aspect ratio in accordance with certain embodiments. A coupling interface has a hood coupled thereto which blocks stray light incident at very high angles from the sides from impinging upon the image sensor and negative affecting captured image quality. A sleeve is inserted which has an outer wall surface shaped in conformance with a shape of an inner wall of a recess in either the hood or the bayonet coupling interface or both. A housing is inserted that has an outer wall surface shaped in conformance with the shape of an inner wall surface of the sleeve. A catch or latch may include a separate pin, screw, rod or spring-loaded member or a hinged component that is attached to the sleeve, housing or hood.

In the illustrative example method of assembling an anamorphic optic of FIGS. 2A-2B, the bayonet is disposed such that a hood may be placed on top of it. A sleeve is press fit to the bayonet interface component through the hood. An adhesive may be applied to bond the sleeve to the bayonet interface component. The hood may be captured in place, while the bayonet interface component is allowed to rotate ninety degrees around the lip of the hood. A slot in the sleeve should be aligned with a threaded hole in the bayonet interface component.

Figure 3A:
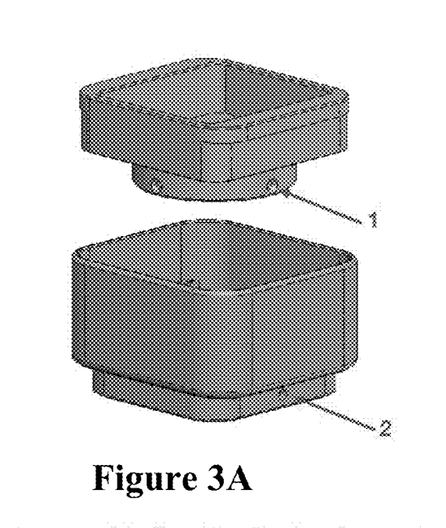
FIGS. 3A-3B schematically illustrate in a partially exploded view and in a cross-sectional side view, respectively, an anamorphic optical assembly configured to provide anamorphic images in both horizontal and vertical orientations of a miniature camera module of a mobile electronic device in accordance with certain embodiments.
Figure 3B:
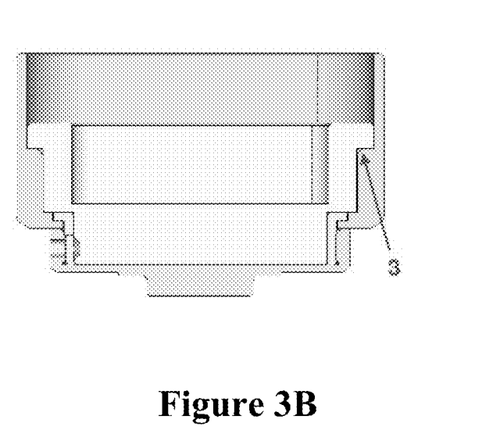

FIGS. 3A-3B schematically illustrate in a partially exploded view and in a cross-sectional side view, respectively, an anamorphic optical assembly configured to provide anamorphic images in both horizontal and vertical orientations of a miniature camera module of a mobile electronic device in accordance with certain embodiments.

FIGS. 3A-3B illustrate another example that embodies a process of assembling an optical element in accordance with an anamorphic rotating design concept. The housing that includes the anamorphic optical element includes one or more indents or other alignment artefacts that may be aligned with indents in the bayonet interface component and/or in an optional sleeve component that may be juxtaposed concentrically between the housing and bayonet components. The threaded hole in the bayonet interface component may be used as a reference for alignment. The housing may be adhered or otherwise coupled to the bayonet component, e.g., with permanent Loctite adhesive or valcro or by insertion of a flexible protruding material into a snug groove or curved or polygonal-shaped recess having an optional catch formed as angled flexible protrusions or an angled protrusion and a groove or recess.

Figure 4A:
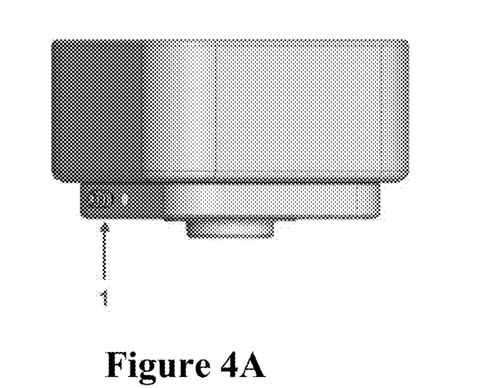
FIGS. 4A-4B schematically illustrate in a side view and in a cross-sectional side view, respectively, an example of an anamorphic optical assembly that includes a catch for latching the bayonet coupling interface in fixed orientation relative to the housing defining the anamorphic aperture of the anamorphic optical assembly for capturing digital images in a cinematic view in a first orientation and for unlathching the bayonet coupling interface from the housing defining the anamorphic aperture in order to rotate the bayonet coupling interface relative to an orientation of the anamorphic aperture to accommodate different camera orientations in accordance with certain embodiments.
Figure 4B:
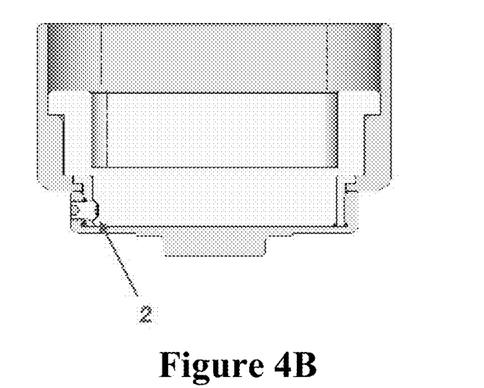

FIGS. 4A-4B schematically illustrate in a side view and in a cross-sectional side view, respectively, an example of an anamorphic optical assembly that includes a catch for latching the bayonet coupling interface in fixed orientation relative to the housing defining the anamorphic aperture of the anamorphic optical assembly for capturing digital images in a cinematic view in a first orientation and for unlathching the bayonet coupling interface from the housing defining the anamorphic aperture in order to rotate the bayonet coupling interface relative to an orientation of the anamorphic aperture to accommodate different camera orientations in accordance with certain embodiments.

FIGS. 4A-4B schematically illustrate yet another example embodiment of an anamorphic rotating design concept. An M2×2.5 mm set screw may be penetrated into the side of the bayonet interface component. The set screw may be tightened until it makes contact. The bayonet interface component may be locked to prevent it from rotating. In certain embodiments, there are two distinguishable pockets formed in the housing. This allows the bayonet interface component to rotate 90 degrees between two different positions of stable disposition relative to the housing.

Figure 5A:
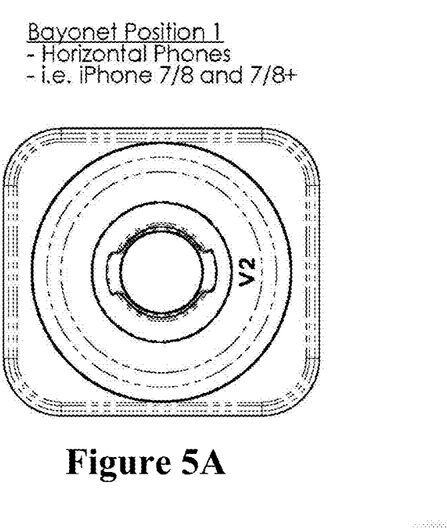
FIGS. 5A-5B schematically illustrate in bottom views of an example anamorphic optical assembly in accordance with certain embodiments having bayonet orientations that are parallel and perpendicular, respectively, to the long dimension of an anamorphic aperture of the example anamorphic optical assembly.
Figure 5B:
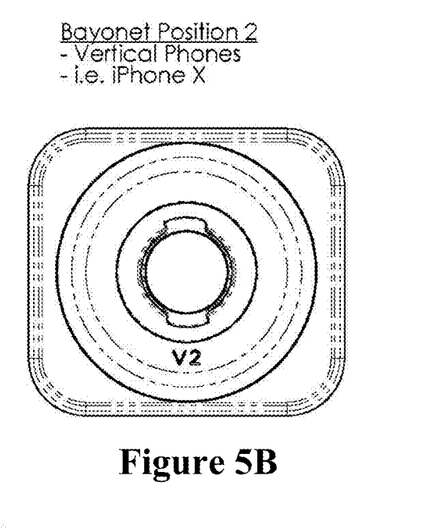
Figure 6A:
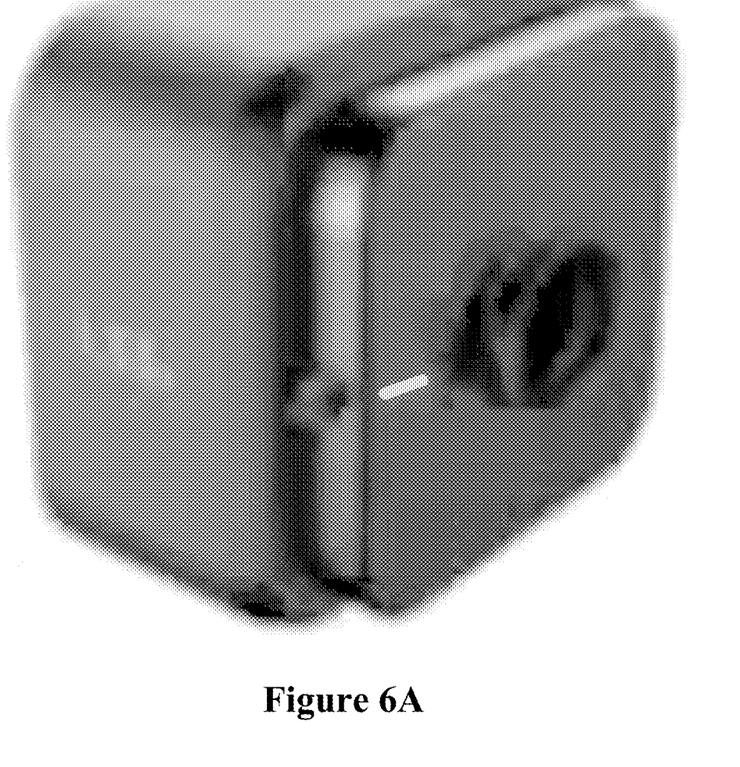
FIGS. 6A-6E schematically illustrate perspective views of an anamorphic optical assembly, including a housing or a hood that defines or contains an anamorphic aperture and that is coupled with a bayonet coupling interface that starts in a first bayonet position relative to an orientation of the housing or hood and the orientation of the anamorphic aperture and being rotated through ninety degrees to a second bayonet position perpendicular to the first bayonet position in accordance with certain embodiments.
Figure 6B:
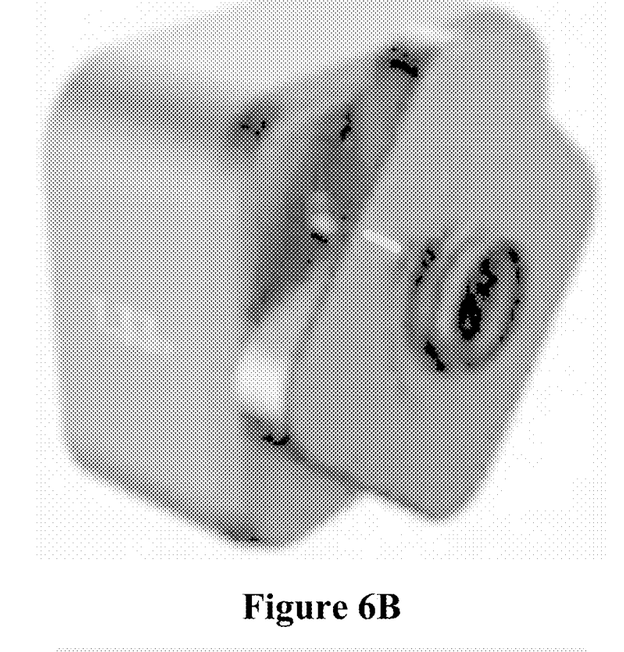
Figure 6C:
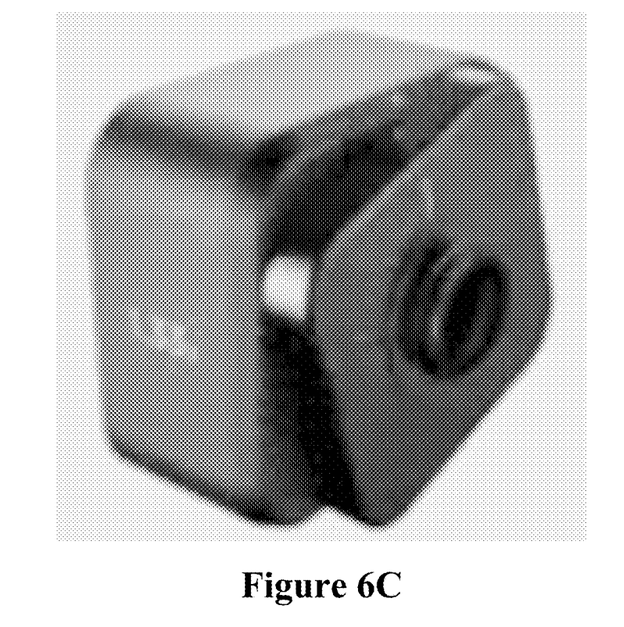
Figure 6D:
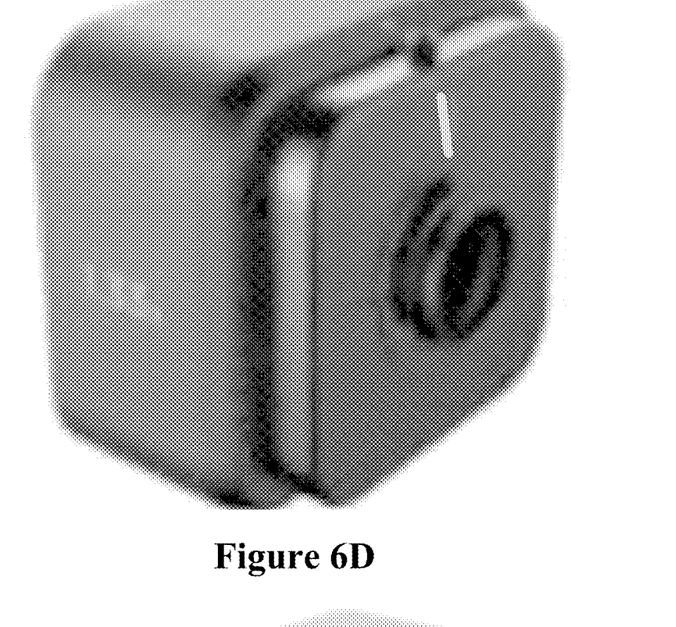
Figure 6E:
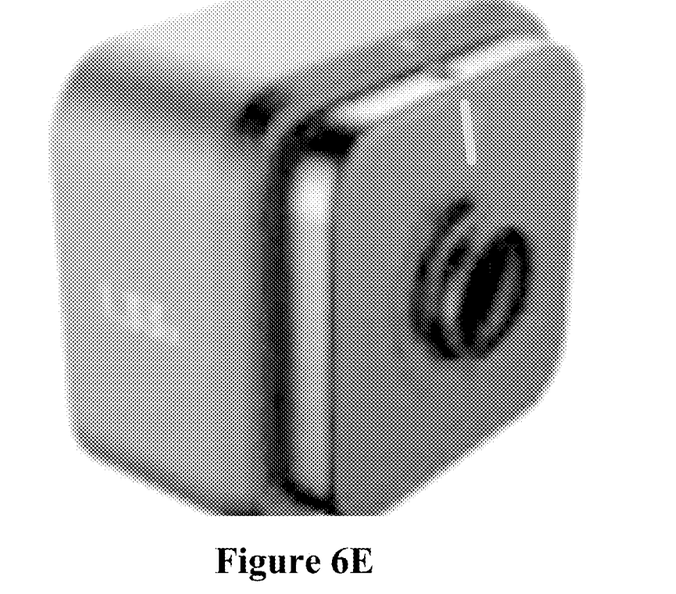

FIGS. 5A-5B schematically illustrate in bottom views of an example anamorphic optical assembly in accordance with certain embodiments having bayonet orientations that are parallel and perpendicular, respectively, to the long dimension of an anamorphic aperture of the example anamorphic optical assembly. For example, bayonet position 1 of FIG. 5A may be used when coupling the anamorphic optical assembly to a horizontal phone such as the iphone 7/8 and 7/8+. Bayonet position 2 of FIG. 5B may be used when coupling the anamorphic optical assembly to a vertical phone such as the iphone X.

FIGS. 6A-6E schematically illustrate perspective views of an anamorphic optical assembly, including a housing or a hood that defines or contains an anamorphic aperture and that is coupled with a bayonet coupling interface that starts in a first bayonet position relative to an orientation of the housing or hood and the orientation of the anamorphic aperture and being rotated through ninety degrees to a second bayonet position perpendicular to the first bayonet position in accordance with certain embodiments.

Many different embodiments of an auxiliary anamorphic optical assembly have been described. These may be configured to couple to a protective case for a mobile device in accordance with additional embodiments that may include one or more of the following features. A protective battery case for a mobile device may comprise a one-piece protective case made of a single, uniform TPE/PC composite material using double shot injection molding. Alternatively, a battery case may include two or more layers. A soft elastomer layer may be over-molded onto a rigid material layer, wherein the two material layer battery case still comprises a one-piece case.

A charger for a battery case or mobile device may be contained entirely within a one-piece, single TPE/PC or TPU/PC or TPU blend/PC composite material protective case that extends entirely around five sides of an inserted phone or other mobile device. A battery case may be disposed in a wholly enclosed compartment that is fixed shut, such that the battery is not visible even when no phone is inserted within the case, The rechargeable case battery may be secured within a battery compartment such that the case battery is not readily removable. Preferably, there should be one or more screws that would have to be removed using a screwdriver to open the battery compartment and remove the battery from the case, or the battery compartment may be sealed or locked shut in another way that takes multiple steps and preferably a tool such as an allen wrench or a screwdriver is required.

In alternative embodiments, a case battery or battery pack may be visible, accessible or readily removable or replaceable, or combinations thereof. In some of these alternative embodiments, one or more replaceable case batteries are used to power or recharge the mobile device when the mobile device runs out of charge, while in other embodiments, a durable rechargeable case battery is used that may be readily accessible or replaceable or not.

In certain embodiments, the battery case has a uniformly dark black or deep blue color. For example, a Matte black or midnight blue color may be uniform for the whole visible outer elastomer layer of the case. An inner edge of case material that defines a camera-flash aperture may have a same dark color as the rest of the case and a lens attachment aperture may be formed from the same case material. The color of the periphery around the lens attachment aperture and/or a camera-flash opening, or one or none or both may be darker or lighter in color around an inner edge of the camera-flash aperture and/or lens attachment interface than the rest of the case.

An additive may be mixed with the thermoplastic or polycarbonate material during a single or double shot injection molding process of forming the single material, or soft outer layer of a two or more layer design, or double shot injection molding of a uniform PC/thermoplastic composite. The additive would accordingly include a volumetric additive and could serve one or more functional and/or aesthetic objectives, such as strengthening the battery case material by adding glass fibers or carbon fibers or other fibers or elongate nano, molecular, micro and/or macro sized particulates or strengthening components. Another characteristic, attribute or physical parameter of all of part of a battery case such as an electrical, thermal, mechanical or chemical property may be adjusted using a volumetric additive. A surface additive may alternatively or additionally be introduced on an outer case surface as a finish or protective coating, layer, film or particulate additive, or as an aesthetic option for a user.

A camera-flash aperture and/or a lens attachment interface of a battery case in certain embodiments may include a bevel or may appear to include a bevel or may be defined by a straight, uniform peripheral edge from outer to inner surface. A camera-flash aperture may be formed in a soft outer material layer that is a uniform cutout, while a separate lens attachment interface may have a bevel or customized shape to fit an auxiliary lens coupling component, and may have a built-in or integral capture plate and/or catch or spring clip, or may be coupled permanently or temporarily at a peripheral edge of a lens attachment aperture to facilitate coupling with an attachable lens and/or to enhance a precision and/or stability of alignment and/or relative disposition within an optical assembly of a camera module of a mobile device that is inserted within the case.

An outer surface dimension of a camera-flash aperture, with or without lens attachment interface coupled or integrated therewith, may be larger or smaller or a same size as the same inner surface dimension of the camera flash aperture. In certain embodiments, the outer dimension may be larger particularly for a reduction optical system and vice-versa for an optical assembly that provides magnification of small objects such as a microscope objective. In certain embodiments, the inner or outer dimensions of both a camera flash aperture and lens attachment interface may be larger, smaller or the same. The lens attachment aperture will typically be smaller than a camera flash opening, or may include a segment that protrudes into the camera flash opening, e.g., as in embodiments that include a capture plate.

A certain surface dimension of a camera-flash aperture of the case, with or without the lens attachment interface coupled or integrated therewith, may include a single cutout and no light isolation mechanism protruding between the camera and flash components on the camera module of the device, or a camera and flash may be separated for a particularly mobile device or certain imaging applications may produce enhanced images when separate camera and flash openings are used to transmit out of the battery case flash illumination and/or receive into the battery case focusing component rays for forming images on a camera module image sensor and presenting them on a display.

An otherwise hollow case volume may have disposed therein a chin combination to enhance sound propagation and/or reduce noise for sounds generated from a speaker and/or received at a microphone of the mobile device. The sound propagation pathway or pathways provided by the chin combination may comprise sound reflecting inner and outer wall surfaces, wherein care may be taken not to use sound absorbing materials on the inner surfaces, although if volume is not an issue than the chin combination enclosure may be configured to enhance the sounds by including sound dampening areas or surfaces along a sound path from a mobile device speaker and/or to a mobile device microphone.

A battery case in certain embodiments may include a set of one or more inner case audio openings immediately proximate iphone or other mobile device speakers and/or a speaker or speakers and a mic. Another set of outer case audio openings may be defined in the outer wall of the battery case, which may be small and irregularly shaped due to component clutter or may be similar in size to the inner audio openings and/or may be larger such as to expand or compress the sound depending on which direction through the chin enclosure that the sound is propagated. A battery case may include inner case audio openings and outer case audio opening that face perpendicular or parallel directions, such as a case with downward facing inner audio openings and outer audio opening that are defined in a front surface, bottom surface, one or two side surfaces or rear surface, or combinations thereof. In one embodiment, inner and outer audio openings respectively face downward from the bottom and out of the front, and these may be spaced apart by between 1.0 mm and 8.5 mm in certain embodiments. The shape of the sound path provided by a chin combination may be rounded or boxy with or without any rectangular or equivalent sides.

A battery case in certain embodiments may be entirely open in the front such that an entire front surface of an inserted mobile device is directly accessible and not overlapping by any front surface area of the case, or an overhang may overlap a peripheral edge of a front surface of a mobile device without actually forming a front surface. A peripheral wall may be continuous and form a closed path that snugly fits a mobile device periphery. The battery case may elastically or frictionally grip or overlap a front surface periphery of an inserted mobile device such as by overhanging the phone around the entire periphery or one or more opposed pairs of periphery segments, and any part of the entire lengths of the top and bottom and left and right sides may participate to hold the mobile device in a form fit recess defined at a front wall or front facing surface of a front or back wall of the battery case. A back side of a battery case may have one or more small or large windows or cutouts for built-in components such as a display or a USB or other power, data, wired, wireless, satellite or other antenna or communications or network interfacing transmitter, receiver, UI, audio or visual or other display components. In certain embodiments, the battery case has a solid continuous back wall, except for a hidden or otherwise inaccessible rechargeable battery compartment or a camera-flash aperture or a lens attachment aperture or a case battery voltage or charge level indicator LED cavity or audio opening, or combinations thereof.

In certain embodiments, a spring or elastic component may be heat staked or otherwise coupled in place between two rigid material layer components to provide a compression tendency to a portion of the case and/or between the two rigid material layer components in certain embodiments. This spring in these embodiments may be configured to provide an enduring grip around the periphery of the phone, or particularly at the top of the phone to counter any stretching wearing around a hinge region or bendable zone that permits insertion of the mobile device without removing a top, bottom or side peripheral wall portion for that purpose, or a top, bottom, left side or right side peripheral wall segment of a battery case may be removable and reattachable such as by providing a first hinge for rotating a peripheral segment out of the way to permit insertion of a mobile device after which the peripheral segment is rotated back into place. A coupling or locking mechanism may be included at an opposite end of the rotatable peripheral segment as the first hinge for securing the segment within the periphery of the battery case.

A battery case in certain embodiments may include a processor or a switch for opening and closing an electrical connection between the rechargeable case battery and a mobile device battery. In certain embodiments, when a phone is inserted into the battery case and connected to a lightning connector or other power connector, the rechargeable case battery may be automatically connected to the phone and charging the phone. A battery case may include a voltage or current monitoring circuit and trigger certain events when certain levels are measured. The battery case in certain embodiments does not monitor any electrical quantities or data, while in other embodiments, a mobile device battery charge level is monitored by the battery case so that when the battery case is plugged into a wall outlet, the phone battery is recharged first until the phone battery level is fully charged, and then the case battery is recharged.

A battery case in certain embodiments includes no user-actuatable switch interfaces, neither for actuating a power switch, nor particularly for manipulating volume switches, a silent mode switch or a power button of the mobile device or a shutter button, dial, wheel, touchpad or other UI device that may be wired or wirelessly coupled to the mobile device for controlling the mobile device.

A battery case may define apertures in a back wall such as a camera-flash aperture and/or a battery level indicator LED cavity, which are small, off-center and neither circular nor matching a shape of the outer periphery of the case in certain embodiments. A relatively small camera flash aperture may have a chamfered shape and a very small single LED cavity may be off-center defined in the back wall or in one or the four side peripheral walls, and may be defined in the front face, bottom face or a side wall of the bottom peripheral segment, of a battery case in certain embodiments. A battery case in certain embodiments includes a substantially continuous back wall and outer peripheral wall portions and encloses a rechargeable battery for charging an inserted device, a PCB with or without a processor, one or more lightning connectors or power and/or data connectors, chin combination components, auxiliary lens attachments and interface components, a three way intersection interface for coordinating flow of charge and/or data between the battery case, the mobile device and external power and/or data sources outside the battery case.

A battery case in certain embodiments may optionally include a Bluetooth radio and/or a wifi receiver/transmitter and/or another kind of wireless or wired communication, for facilitating communication of text and/or data between a battery case in accordance with certain embodiments and an insert mobile device and/or an external device.

A battery case in certain embodiments may include multiple materials of different shapes, sizes, rigidity, texture, elasticity, or other parameter may be coupled together in abutting relationship to enclose a mobile device. A single composite material layer for a battery case may be made by single or double shot injection molding. Two sections of a battery case may be integral with each other or adjacent to each other or overlapping each other or coupled together directly or via a coupling interface component or coupling process.

In certain embodiments, a battery case may charge an inserted mobile device whenever the device is plugged into the battery case. Alternative battery case embodiments include a switch for manually starting and stopping charge flow, and or for directing charging to one or multiple devices that connected together. In another embodiment, a battery case can have multiple devices that connected respectively at multiple charge/power connectors available within multiple mobile device compartments within the battery case. In some of these embodiments, the battery case may have a UI for determining which device to charge or for setting charging priorities for charging certain devices (ipod, iphone, ipad, iwatch) from the rechargeable case battery or from the wall outlet, and/or for setting priorities for charging from certain charging sources (e.g., battery case 1, battery case 2, wall outlet, laptop 1).

A battery case may use a wire connection to charge an inserted mobile device, and/or may use induction or wireless charging. A battery case in accordance with several illustrated embodiments may include a form fitting design. For engineering purposes, a battery case may purposefully include a 0.1 mm gap or a 0.5 mm or less gap in certain areas to allow for manufacturing and material tolerance. A battery case may be form fit to a phone or other mobile device, or alternatively spaced may be provided for adding cushions that may be removed and replaced with other optical or UI components. A battery case may have cushions with flanges extending beyond an outer battery case wall.

A battery case may have an earbud aperture or two earbud apertures and/or USB, lightning, or other connector interfaces for peripheral and/or accessory items. A battery case may be configured to couple to a stand or vehicle mount accessory and/or a mount accessory may be built into the battery case or carried in a compartment.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such as phrases in some instances shall not be read to mean that the narrower case is intended or required in instances where such broadening phrases may be absent. The use of the terms "system" or "assembly" does not imply that the components or functionality described or claimed as part of the assembly are all configured in a common package. Indeed, any or all of the various components of a system, e.g., a case and a lens attachment interface may be combined in a single package or separately maintained and may further be manufactured, assembled or distributed at or through multiple locations.

In addition, all references cited above and below herein, as well as the background, invention summary, abstract and brief description of the drawings, are all incorporated by reference into the detailed description of the preferred embodiments as disclosing alternative embodiments. Several embodiments of point action cameras have been described herein and schematically illustrated by way of example physical, electronic and optical architectures. Other point action camera embodiments and embodiments of features and components of point action cameras that may be included within alternative embodiments, may be described at one or a combination of U.S. Pat. Nos. 7,612,997, 8,244,299, 8,593,745, 8,843,177, US published patent applications nos. 2006/0124676, 2012/0282977, 2014/0071547, 2014/0226268, 2014/0071547, 2013/0063554, 2010/0253826, 2009/0299813, 2002/0000689, 2001/0121116, 2009/0089842, 2008/0276293, 2008/0271105, 2008/0271104, 2008/0172708 and/or European patent no. EP2613448.

We claim:

1. An anamorphic optical assembly configured for coupling within an optical path of a miniature camera module of a mobile electronic device to change an aspect ratio of an image captured by the miniature camera module of said mobile device wherein said anamorphic optical assembly comprises:
   a bayonet coupling interface configured for coupling said anamorphic lens assembly to a lens attachment interface that is coupled to or integral with said mobile device;
   a hood disposed between an object facing surface of said bayonet coupling interface and an object end of the optical path of the miniature camera module of said mobile device;
   a housing defining an anamorphic aperture disposed adjacent to said bayonet coupling interface within a hollow interior volume of said hood;
   a sleeve coupled concentrically between said bayonet coupling interface and said housing, said sleeve being configured to facilitate smooth rotation of the bayonet coupling interface relative to said anamorphic aperture defined within said housing; and
   a catch that serves to couple the housing in fixed orientation within said hood relative to one or more bayonet tabs of said bayonet coupling interface that are rotatable relative to said orientation of said anamorphic aperture between at least two positions about the optical axis of the anamorphic lens assembly or a second axis parallel to said optical axis,
   wherein said catch comprises a screw, pin, rod or other latching member configured to penetrate both a cavity defined in an outer surface of said bayonet coupling interface and a slot defined in an outer surface of said sleeve, and to couple with a receiving cavity defined in said housing.

2. The anamorphic optical assembly of claim 1, wherein said lens attachment interface comprises a protective mobile phone case at least partially enclosing said mobile electronic device with one or more layers of protective materials, and wherein said case defines a lens attachment aperture therein.

3. A miniature camera module configured for capturing images using a mobile electronic device, the miniature camera module comprising a focusing lens, an image sensor disposed at a focal plane of said focusing lens, and the anamorphic lens assembly of claim 2.

4. The anamorphic optical assembly of claim 1, wherein said anamorphic aperture defined within said housing comprises an oblong shape which facilitates said change in aspect ratio.

5. A miniature camera module configured for capturing images using a mobile electronic device, the miniature camera module comprising a focusing lens, an image sensor disposed at a focal plane of said focusing lens, and the anamorphic lens assembly of claim 4.

6. A miniature camera module configured for capturing images using a mobile electronic device, the miniature camera module comprising a focusing lens, an image sensor disposed at a focal plane of said focusing lens, and the anamorphic lens assembly of claim 1.

7. The miniature camera module of claim 6, wherein said oblong shape comprises an approximately rectangular shape.

8. The miniature camera module of claim 6, wherein said oblong optical cavity is fixed orientationally to said sleeve such that said one or more bayonet tabs are rotatable relative to an orientation of said oblong anamorphic aperture such that said anamorphic aperture is rotatable between horizontal and vertical orientations having a an angular spacing of ninety degrees.

9. The anamorphic optical assembly of claim 1, wherein said oblong shape comprises an approximately rectangular shape.

10. The anamorphic optical assembly of claim 1, wherein said oblong optical cavity is fixed orientationally to said sleeve such that said one or more bayonet tabs are rotatable relative to an orientation of said oblong anamorphic aperture such that said anamorphic aperture is rotatable between horizontal and vertical orientations having a an angular spacing of ninety degrees.

11. An anamorphic optical assembly configured for coupling within an optical path of a miniature camera module of a mobile electronic device to change an aspect ratio of an image captured by the miniature camera module of said mobile device wherein said anamorphic optical assembly comprises:
   a bayonet coupling interface configured for coupling said anamorphic lens assembly to a lens attachment interface that is coupled to or integral with said mobile device;
   a hood disposed between an object facing surface of said bayonet coupling interface and an object end of the optical path of the miniature camera module of said mobile device;
   a housing defining an anamorphic aperture disposed adjacent to said bayonet coupling interface within a hollow interior volume of said hood;
   a sleeve coupled concentrically between said bayonet coupling interface and said housing, said sleeve being configured to facilitate smooth rotation of the bayonet coupling interface relative to said anamorphic aperture defined within said housing; and
   a catch that serves to couple the housing in fixed orientation within said hood relative to one or more bayonet tabs of said bayonet coupling interface that are rotatable relative to said orientation of said anamorphic aperture between at least two positions about the optical axis of the anamorphic lens assembly or a second axis parallel to said optical axis,
   wherein said anamorphic aperture defined within said housing comprises an oblong shape which facilitates said change in aspect ratio, and
   wherein said oblong shape comprises an approximately rectangular shape.

12. A miniature camera module configured for capturing images using a mobile electronic device, the miniature camera module comprising a focusing lens, an image sensor disposed at a focal plane of said focusing lens, and the anamorphic lens assembly of claim 11.

13. An anamorphic optical assembly configured for coupling within an optical path of a miniature camera module of a mobile electronic device to change an aspect ratio of an image captured by the miniature camera module of said mobile device wherein said anamorphic optical assembly comprises:

a bayonet coupling interface configured for coupling said anamorphic lens assembly to a lens attachment interface that is coupled to or integral with said mobile device;

a hood disposed between an object facing surface of said bayonet coupling interface and an object end of the optical path of the miniature camera module of said mobile device;

a housing defining an anamorphic aperture disposed adjacent to said bayonet coupling interface within a hollow interior volume of said hood;

a sleeve coupled concentrically between said bayonet coupling interface and said housing, said sleeve being configured to facilitate smooth rotation of the bayonet coupling interface relative to said anamorphic aperture defined within said housing; and a catch that serves to couple the housing in fixed orientation within said hood relative to one or more bayonet tabs of said bayonet coupling interface that are rotatable relative to said orientation of said anamorphic aperture between at least two positions about the optical axis of the anamorphic lens assembly or a second axis parallel to said optical axis, wherein said anamorphic aperture defined within said housing comprises an oblong shape which facilitates said change in aspect ratio, and wherein said oblong optical cavity is fixed orientationally to said sleeve such that said one or more bayonet tabs are rotatable relative to an orientation of said oblong anamorphic aperture such that said anamorphic aperture is rotatable between horizontal and vertical orientations having a an angular spacing of ninety degrees.

14. A miniature camera module configured for capturing images using a mobile electronic device, the miniature camera module comprising a focusing lens, an image sensor disposed at a focal plane of said focusing lens, and the anamorphic lens assembly of claim 13.

15. A method of changing an aspect ratio of an image captured by a miniature camera module installed on a mobile device, wherein said method comprises:

coupling an anamorphic optical assembly within an optical path of said miniature camera module of a mobile electronic device including coupling a bayonet coupling interface of said anamorphic lens assembly to a lens attachment interface that is coupled to or integral with said mobile device or a mobile device case;

disposing a sleeve concentrically between said bayonet coupling interface and a housing component that has an anamorphic aperture defined therein to change an aspect ratio of an image captured by a miniature camera module on a mobile device, said sleeve being configured to facilitate smooth rotation of one or more bayonet tabs of the bayonet coupling interface relative to said sleeve; and latching the housing component in fixed orientation relative to said sleeve such that said one or more bayonet tabs of said bayonet coupling interface are rotatable relative to said orientation of said anamorphic aperture between at least two positions about the optical axis of the anamorphic lens assembly or a second axis parallel to said optical axis, wherein said catch comprises a screw, pin, rod or other latching member configured to penetrate both a cavity defined in an outer surface of said housing and a slot defined in an outer surface of said sleeve to fix a relative rotational orientation of said anamorphic aperture to an orientation of said sleeve for rotating the anamorphic aperture relative to the one or more bayonet tabs.

16. A method of changing an aspect ratio of an image captured by a miniature camera module installed on a mobile device, wherein said method comprises:

coupling an anamorphic optical assembly within an optical path of said miniature camera module of a mobile electronic device including coupling a bayonet coupling interface of said anamorphic lens assembly to a lens attachment interface that is coupled to or integral with said mobile device or a mobile device case;

disposing a sleeve concentrically between said bayonet coupling interface and a housing component that has an anamorphic aperture defined therein to change an aspect ratio of an image captured by a miniature camera module on a mobile device, said sleeve being configured to facilitate smooth rotation of one or more bayonet tabs of the bayonet coupling interface relative to said sleeve; and latching the housing component in fixed orientation relative to said sleeve such that said one or more bayonet tabs of said bayonet coupling interface are rotatable relative to said orientation of said anamorphic aperture between at least two positions about the optical axis of the anamorphic lens assembly or a second axis parallel to said optical axis, and latching said bayonet coupling interface through said sleeve to said housing to fix the orientation of the anamorphic aperture at a selected orientation and unlatching said bayonet coupling interface from said housing through said sleeve to change the orientation of the anamorphic aperture to a different orientation relative to said one or more tabs of said bayonet coupling interface.

17. A method of changing an aspect ratio of an image captured by a miniature camera module installed on a mobile device, wherein said method comprises:

coupling an anamorphic optical assembly within an optical path of said miniature camera module of a mobile electronic device including coupling a bayonet coupling interface of said anamorphic lens assembly to a lens attachment interface that is coupled to or integral with said mobile device or a mobile device case;

disposing a sleeve concentrically between said bayonet coupling interface and a housing component that has an anamorphic aperture defined therein to change an aspect ratio of an image captured by a miniature camera module on a mobile device, said sleeve being configured to facilitate smooth rotation of one or more bayonet tabs of the bayonet coupling interface relative to said sleeve; and latching the housing component in fixed orientation relative to said sleeve such that said one or more bayonet tabs of said bayonet coupling interface are rotatable relative to said orientation of said anamorphic aperture between at least two positions about the optical axis of the anamorphic lens assembly or a second axis parallel to said optical axis, wherein the different orientations include horizontal and vertical orientations having angular spacing of approximately ninety degrees.

18. One or more non-transitory digital storage devices having code embedded therein for programming a processor to perform a method of changing an aspect ratio of an image captured by a miniature camera module installed on a mobile electronic device, wherein said method comprises:

coupling an anamorphic optical assembly within an optical path of said miniature camera module of a mobile electronic device including coupling a bayonet coupling interface of said anamorphic lens assembly to a lens attachment interface that is coupled to or integral with said mobile device or a mobile device case;

disposing a sleeve concentrically between said bayonet coupling interface and a housing component that has an anamorphic aperture defined therein to change an aspect ratio of an image captured by a miniature camera module on a mobile device, said sleeve being configured to facilitate smooth rotation of one or more bayonet tabs of the bayonet coupling interface relative to said sleeve; and latching the housing component in fixed orientation relative to said sleeve such that said one or more bayonet tabs of said bayonet coupling interface are rotatable relative to said orientation of said anamorphic aperture between at least two positions about the optical axis of the anamorphic lens assembly or a second axis parallel to said optical axis, wherein said catch comprises a screw, pin, rod or other latching member configured to penetrate both a cavity defined in an outer surface of said housing and a slot defined in an outer surface of said sleeve to fix a relative rotational orientation of said anamorphic aperture to an orientation of said sleeve for rotating the anamorphic aperture relative to the one or more bayonet tabs.

19. The method of claim 18, wherein the different orientations include horizontal and vertical orientations having angular spacing of approximately ninety degrees.

20. One or more non-transitory digital storage devices having code embedded therein for programming a processor to perform a method of changing an aspect ratio of an image captured by a miniature camera module installed on a mobile electronic device, wherein said method comprises:

coupling an anamorphic optical assembly within an optical path of said miniature camera module of a mobile electronic device including coupling a bayonet coupling interface of said anamorphic lens assembly to a lens attachment interface that is coupled to or integral with said mobile device or a mobile device case;

disposing a sleeve concentrically between said bayonet coupling interface and a housing component that has an anamorphic aperture defined therein to change an aspect ratio of an image captured by a miniature camera module on a mobile device, said sleeve being configured to facilitate smooth rotation of one or more bayonet tabs of the bayonet coupling interface relative to said sleeve; and latching the housing component in fixed orientation relative to said sleeve such that said one or more bayonet tabs of said bayonet coupling interface are rotatable relative to said orientation of said anamorphic aperture between at least two positions about the optical axis of the anamorphic lens assembly or a second axis parallel to said optical axis, and latching said bayonet coupling interface through said sleeve to said housing to fix the orientation of the anamorphic aperture at a selected orientation and unlatching said bayonet coupling interface from said housing through said sleeve to change the orientation of the anamorphic aperture to a different orientation relative to said one or more tabs of said bayonet coupling interface.

21. The method of claim 20, wherein the different orientations include horizontal and vertical orientations having angular spacing of approximately ninety degrees.

22. One or more non-transitory digital storage devices having code embedded therein for programming a processor to perform a method of changing an aspect ratio of an image captured by a miniature camera module installed on a mobile electronic device, wherein said method comprises:

coupling an anamorphic optical assembly within an optical path of said miniature camera module of a mobile electronic device including coupling a bayonet coupling interface of said anamorphic lens assembly to a lens attachment interface that is coupled to or integral with said mobile device or a mobile device case;

disposing a sleeve concentrically between said bayonet coupling interface and a housing component that has an anamorphic aperture defined therein to change an aspect ratio of an image captured by a miniature camera module on a mobile device, said sleeve being configured to facilitate smooth rotation of one or more bayonet tabs of the bayonet coupling interface relative to said sleeve; and latching the housing component in fixed orientation relative to said sleeve such that said one or more bayonet tabs of said bayonet coupling interface are rotatable relative to said orientation of said anamorphic aperture between at least two positions about the optical axis of the anamorphic lens assembly or a second axis parallel to said optical axis, wherein the different orientations include horizontal and vertical orientations having angular spacing of approximately ninety degrees.

* * * * *